United States Patent
McConnell et al.

(10) Patent No.: US 10,979,306 B2
(45) Date of Patent: Apr. 13, 2021

(54) SYSTEM FOR BACKEND RESOURCE MANAGEMENT SIMULATION AND LIVE DEPLOYMENT

(71) Applicant: BANK OF AMERICA CORPORATION, Charlotte, NC (US)

(72) Inventors: Patrick Thomas McConnell, Huntersville, NC (US); William Bradley Burks, Charlotte, NC (US); Daniel James Doherty, Huntersville, NC (US); Justin Riley duPont, Charlotte, NC (US); Thomas Elliott, Redwood City, CA (US); Tony England, Tega Cay, SC (US); Matthew Murphy, Charlotte, NC (US); Nickolas Patrick Parker, Charlotte, NC (US); Stephen Philip Selfridge, Huntersville, NC (US); Steven Michael Twombly, Saco, ME (US); James J. Williams, Lincoln University, PA (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 0 days.

(21) Appl. No.: 16/434,604

(22) Filed: Jun. 7, 2019

(65) Prior Publication Data
US 2020/0389363 A1 Dec. 10, 2020

(51) Int. Cl.
*H04L 12/24* (2006.01)
*H04L 29/08* (2006.01)
*H04L 29/06* (2006.01)

(52) U.S. Cl.
CPC ............ *H04L 41/145* (2013.01); *H04L 41/22* (2013.01); *H04L 67/20* (2013.01); *H04L 67/38* (2013.01)

(58) Field of Classification Search
USPC ......................................................... 709/223
See application file for complete search history.

(56) References Cited

U.S. PATENT DOCUMENTS

| | | |
|---|---|---|
| 5,774,878 A | 6/1998 | Marshall |
| 6,418,419 B1 | 7/2002 | Nieboer et al. |
| 6,421,653 B1 | 7/2002 | May |
| 6,564,191 B1 | 5/2003 | Reddy |
| 6,594,643 B1 | 7/2003 | Freeny |
| 7,165,044 B1 | 1/2007 | Chaffee |
| 7,359,876 B1 | 4/2008 | Redpath et al. |
| 7,536,332 B2 | 5/2009 | Rhee |
| 7,783,547 B1 | 8/2010 | Gorer |
| 7,827,090 B2 | 11/2010 | Thompson et al. |

(Continued)

*Primary Examiner* — Hermon Asres
(74) *Attorney, Agent, or Firm* — Michael A. Springs; Moore & Van Allen PLLC; Nicholas C. Russell (57) ABSTRACT

The invention comprises a user friendly investment strategy platform. This invention allows for a drag-and-drop platform for various sectors, strategies, vehicles, and timing in the form of blocks. This allows a user to generate any desired resource management strategy and the system may deploy the strategy as a simulated resource management action. Furthermore, the system allows for deployment of the resource action live on a resource exchange upon user authorization. The blocks include object codes that are programmed to build out any possible resource management strategy. The invention may also suggest or recommend thresholds, and other templates that allow for customization.

15 Claims, 6 Drawing Sheets

(56) References Cited

U.S. PATENT DOCUMENTS

| | | |
|---|---|---|
| 8,145,558 B2 | 3/2012 | Duquette |
| 8,229,837 B2 | 7/2012 | Duquette |
| 8,301,535 B1 | 10/2012 | Zerenner et al. |
| 8,412,623 B2 | 4/2013 | Moon et al. |
| 8,504,458 B1 | 8/2013 | Lai et al. |
| 8,688,575 B2 | 4/2014 | Steiner |
| 8,732,060 B2 | 5/2014 | Salomon et al. |
| 9,164,577 B2 | 10/2015 | Tapley et al. |
| 9,369,406 B2 * | 6/2016 | Thomas .................. G06F 3/067 |
| 2011/0258139 A1 * | 10/2011 | Steiner .................. G06Q 40/06 705/36 R |
| 2012/0035903 A1 * | 2/2012 | Chen ...................... G06Q 10/10 703/21 |
| 2013/0290216 A1 | 10/2013 | Scheffler |

* cited by examiner

SYSTEM FOR BACKEND RESOURCE MANAGEMENT SIMULATION AND LIVE DEPLOYMENT

BACKGROUND

As platforms for resource management increasingly allow for complex management strategies to be implemented by users, the need to easily adapt and project the potential success or failure of various strategies becomes of greater importance. As such, the use of user-friendly systems for resource management simulation and deployment are desired to allow users to develop complex resource management tactics without mandatory knowledge of backend advanced coding languages.

BRIEF SUMMARY

The following presents a summary of certain embodiments of the invention. This summary is not intended to identify key or critical elements of all embodiments nor delineate the scope of any or all embodiments. Its sole purpose is to present certain concepts and elements of one or more embodiments in a summary form as a prelude to the more detailed description that follows.

Embodiments of the present invention address the above needs and/or achieve other advantages by providing apparatuses (e.g., a system, computer program product and/or other devices) and methods for backend resource management simulation and live deployment. The system embodiments may comprise one or more memory devices having computer readable program code stored thereon, a communication device, and one or more processing devices operatively coupled to the one or more memory devices, wherein the one or more processing devices are configured to execute the computer readable program code to carry out the invention. In computer program product embodiments of the invention, the computer program product comprises at least one non-transitory computer readable medium comprising computer readable instructions for carrying out the invention. Computer implemented method embodiments of the invention may comprise providing a computing system comprising a computer processing device and a non-transitory computer readable medium, where the computer readable medium comprises configured computer program instruction code, such that when said instruction code is operated by said computer processing device, said computer processing device performs certain operations to carry out the invention.

For sample, illustrative purposes, system environments will be summarized. The system may involve providing a graphical user interface via a user device, receiving user input for one or more resource actions via the graphical user interface on the user device, determining, based on the received user input, required backend coding logic for simulation of the one or more resource actions, generating, by executing the backend coding logic, a simulation of the one or more resource actions, and displaying, via the graphical user interface of the user device, the generated simulation of the one or more resource actions.

In some embodiments, the system is further configured to display, via the graphical user interface of the user device, a selectable option to implement the one or more resource actions based on results of the generated simulation.

The resource actions shown on the graphical user interface may, in some embodiments, be represented by one or more moveable blocks, wherein the moveable blocks may be rearranged by the user and contain fields for additional user input comprising resource amounts, resource types, or resource exchanges.

The systems provided may also interact with the user via a virtual reality system, and the system is further configured to receive user input for the one or more resource actions by processing transmitted motion, audio, or biometric information from the virtual reality system.

In some embodiments, the system further comprises retrieving current and historical resource value information from one or more entity systems, continuously calculating the result of the one or more resource actions based on the current and historical resource value information; and providing periodic updated simulation results to the user via the graphical user interface.

In other embodiments, the system is further configured to receive, via the user device, user authentication credentials, authenticate the user to enable access to one or more user resource accounts, and initiate the transfer of resources to or from the one or more user resource accounts.

In still other embodiments, the graphical user interface are represented by one or more moveable blocks, wherein the moveable blocks are sorted by thresholds, template resource actions, and customizable resource management strategies.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Having thus described embodiments of the invention in general terms, reference will now be made the accompanying drawings, wherein:

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

Figure 1:
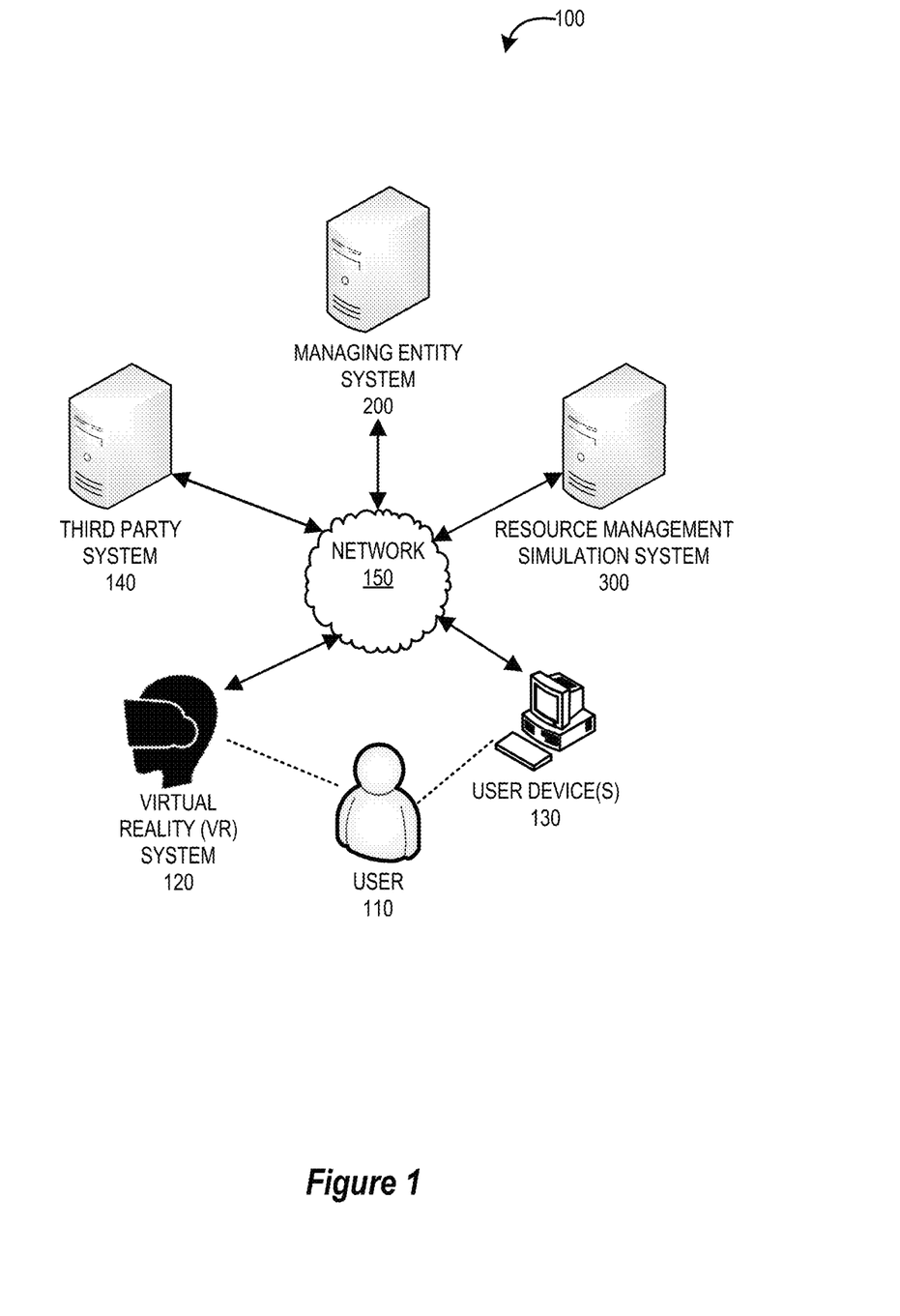
FIG. 1 provides a block diagram illustrating a system environment for backend resource management simulation and live deployment, in accordance with an embodiment of the invention.

FIG. 1 provides a block diagram illustrating a system environment for backend resource management simulation and live deployment, in accordance with an embodiment of the invention. As illustrated in FIG. 1, the environment 100 includes a managing entity system 200, a resource management simulation system 300, one or more user device(s) 130, a Virtual Reality (VR) System 120, and one or more third party systems 140. One or more users 110 may be included in the system environment 100. In some embodiments, the user(s) 110 of the system environment 100 may be customers of a managing entity that controls or otherwise owns the managing entity system 200 and may, in some embodiments, comprise a financial institution.

The managing entity system 200, the resource management simulation system 300, the one or more user device(s) 130, the VR System 120, and/or the third party system 140 may be in network communication across the system environment 100 through the network 150. The network 150 may include a local area network (LAN), a wide area network (WAN), and/or a global area network (GAN). The network 150 may provide for wireline, wireless, or a combination of wireline and wireless communication between devices in the network. In one embodiment, the network 150 includes the Internet. In some embodiments, the VR System 120 may be in connection with the network 150 only when the VR System 120 is an interaction distance of one or more user device(s) 130, the third party system 140.

The managing entity system 200 may be a system owned or otherwise controlled by a managing entity to perform one or more process steps described herein. In some embodiments, the managing entity is a financial institution. In general, the managing entity system 200 is configured to communicate information or instructions with the resource management simulation system 300, the one or more user device(s) 130, and/or the third party system 140 across the network 150. For example, the managing entity system 200 may maintain account data for the user 110 and therefore may receive a transaction request or other event request associated with the user 110 (e.g., via a third party system 140 comprising a merchant system), compare received information to an internal database of a user associated with the user 110, and transmit authentication or other approval information to the resource management simulation system 300, the third party system 140, the user device 130, or the like. Of course, the managing entity system 200 may be configured to perform (or instruct other systems to perform) one or more other process steps described herein, including the steps described with respect to FIG. 5 and FIG. 6. The managing entity system 200 is described in more detail with respect to FIG. 2.

The resource management simulation system 300 may be a system owned or controlled by the managing entity and/or a third party that specializes resource management, resource exchange hosting, user authentication systems, transaction rule systems, and the like. In some embodiments, at least a portion of the resource management simulation system 300 may be controlled by or otherwise be a component of the managing entity system 200. In general, the resource management simulation system 300 is configured to communicate information or instructions with the managing entity system 200, the one or more user device(s) 130, the VR System 120, and/or the third party system 140 across the network 150.

For example, the resource management simulation system 300 may receive historic and current resource exchange values from the third party system 140, the managing entity system 200, the user device 130, or the VR System 120 (e.g., indirectly, via another system), wherein the resource exchange values may indicate the value of a particular resource on a given exchange at a certain time. The resource management simulation system 300 may then analyze and compare received resource exchange values to an expected resource value or resource action stored associated with the user to determine whether the received exchange values match the expected resource data values or if they coincide positively with resource actions, and automatically cause the user device 130 of the user 110 to populate a resource management application with analysis results. As described in more detail with regard to FIG. 5 and FIG. 6, the resource action may comprise a number of different investment or resource exchange strategies for trading or investing resources of any kind, such as fiat currency, cryptocurrency, gold, silver, or any other investment vehicle. Of course the resource management simulation system 300 may be configured to perform (or instruct other systems to perform) one or more other process steps described herein, including the steps described with respect to FIG. 5 and FIG. 6. The resource management simulation system 300 is described in more detail with respect to FIG. 3.

The user device 130 may be a system owned or controlled by the managing entity, the user 110, and/or a third party that specializes in providing computers, mobile devices, or other computing devices that are configured to manage resources, and host or manage resource exchanges. In general, the user device 130 is configured to communicate information or instructions with the managing entity system 200, the resource management simulation system 300, the VR System 120, and/or the third party system 140 across the network 150. For example, the user device 130 may detect an interaction with the VR system 120, extract resource management information, including a resource action information, transmit the resource action information to the managing entity system 200 and/or the resource management simulation system 300, and receive a confirmation or responses from the resource management simulation system 300. Of course, the user device 130 may be configured to perform (or instruct other systems to perform) one or more other process steps described herein, including the steps described with respect to FIG. 5 and FIG. 6. The user device 130 is described in more detail with respect to FIG. 4.

The VR system 120 may comprise any device, system, set of devices, or the like that is configured to generate an experience taking place within simulated and immersive environments that can be similar to or completely different from the real world, or may augment how the user 110 perceives the real world, such as augmented reality (AR) devices, mixed reality devices, and the like. In some embodiments, the VR System 120 may be embedded within, or otherwise be a component of, the user device 130 (e.g., a mobile phone, wearable device, personal computer, gaming system, and the like). In some embodiments, the VR system 120 may use either VR headsets designed to be placed on the head of a user 110, or multi-projected environments to generate realistic images, sounds and other sensations that simulate a physical presence in a virtual environment. A user 110 using VR equipment is able to look around the artificial world, move around in it, and interact with virtual features or items. It is understood that any graphical depictions generated by the resource simulation management system 300, as described in FIG. 5, may be designed to be displayed and interacted with a number of devices, including user device(s) 130 and VR system 120.

The third party system 140 may be any system that interacts with the other systems and devices of the system environment 100 including, but not limited to, merchant systems, automated teller machine device systems, point of sale device systems, online merchant portal systems, regulatory agency systems, data storage systems, third party user authentication systems, third party credit card or debit card systems, transaction systems, resource exchanges, web servers, and the like. For instance, in some embodiments, the managing entity system may need to contact one or more third party system(s) 140 in order to access resource accounts and resource exchanges, gain or check regulatory approval for the movement of resources, verify transactions or occurrences on a blockchain, or share user data that may be pertinent to the experience of the user 110 as they interact with the resource management simulation system 300.

Figure 2:
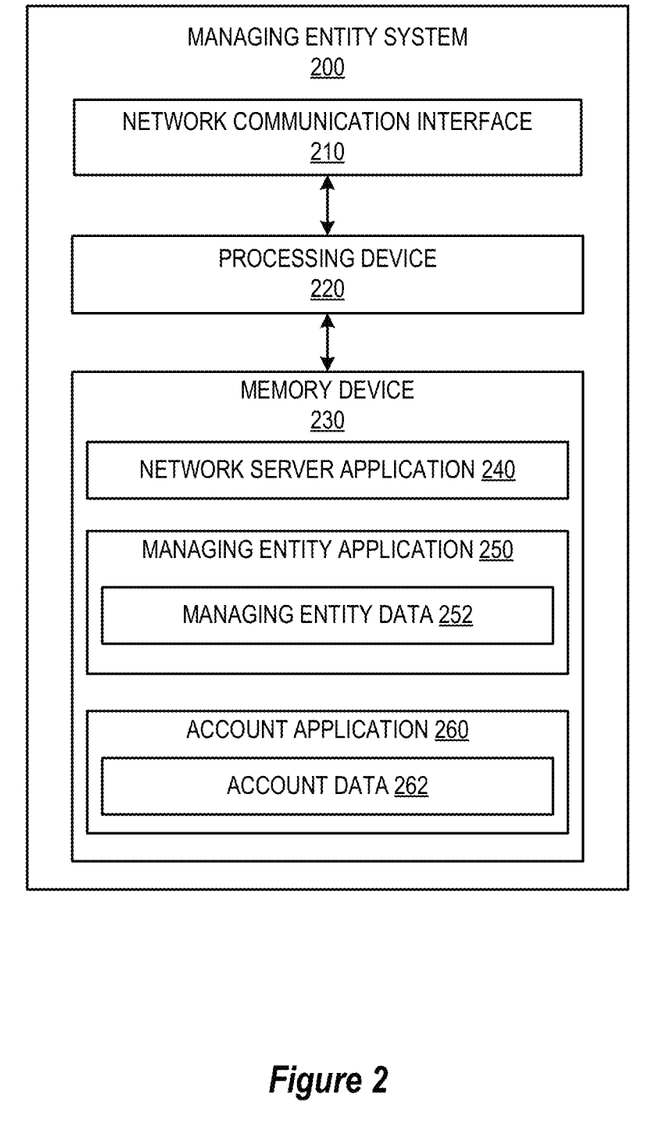
FIG. 2 provides a block diagram illustrating a managing entity system, in accordance with an embodiment of the invention.

FIG. 2 provides a block diagram illustrating the managing entity system 200, in greater detail, in accordance with embodiments of the invention. As illustrated in FIG. 2, in one embodiment of the invention, the managing entity system 200 includes one or more processing devices 220 operatively coupled to a network communication interface 210 and a memory device 230. In certain embodiments, the managing entity system 200 is operated by a first entity, such as a financial institution, while in other embodiments, the managing entity system 200 is operated by an entity other than a financial institution.

It should be understood that the memory device 230 may include one or more databases or other data structures/repositories. The memory device 230 also includes computer-executable program code that instructs the processing device 220 to operate the network communication interface 210 to perform certain communication functions of the managing entity system 200 described herein. For example, in one embodiment of the managing entity system 200, the memory device 230 includes, but is not limited to, a network server application 240, a managing entity application 250 which includes managing entity data 252, an account application 260 which includes account data 262, and other computer-executable instructions or other data. The computer-executable program code of the network server application 240, the managing entity application 250, and/or the account application 260 may instruct the processing device 220 to perform certain logic, data-processing, and data-storing functions of the managing entity system 200 described herein, as well as communication functions of the managing entity system 200.

In one embodiment, the managing entity application 250 includes managing entity data 252. The managing entity data 252 may comprise user information for one or more users that are customers of or are otherwise associated with the managing entity. The managing entity data 252 may additionally include transaction data, including information for establishing secure communication channels with transaction devices, authentication devices, VR devices, and the like.

In one embodiment, the account application 260 includes the account data 262. This account data 262 may include financial account information for one or more users associated with the managing entity system 200. For example, the account data 262 may comprise account numbers, routing numbers, account balances, account rules, account preferences, billing information, credit information, loan information, digital wallet information, authentication information, dynamic resource value information, expected dynamic resource value information, historical and current resource exchange information and the like.

The network server application 240, the managing entity application 250, and the account application 260 are configured to invoke or use the managing entity data 252, the account data 254, and the like when communicating through the network communication interface 210 with the resource management simulation system 300, the one or more user device(s) 130, the VR System 120, and/or the third party system 140.

Figure 3:
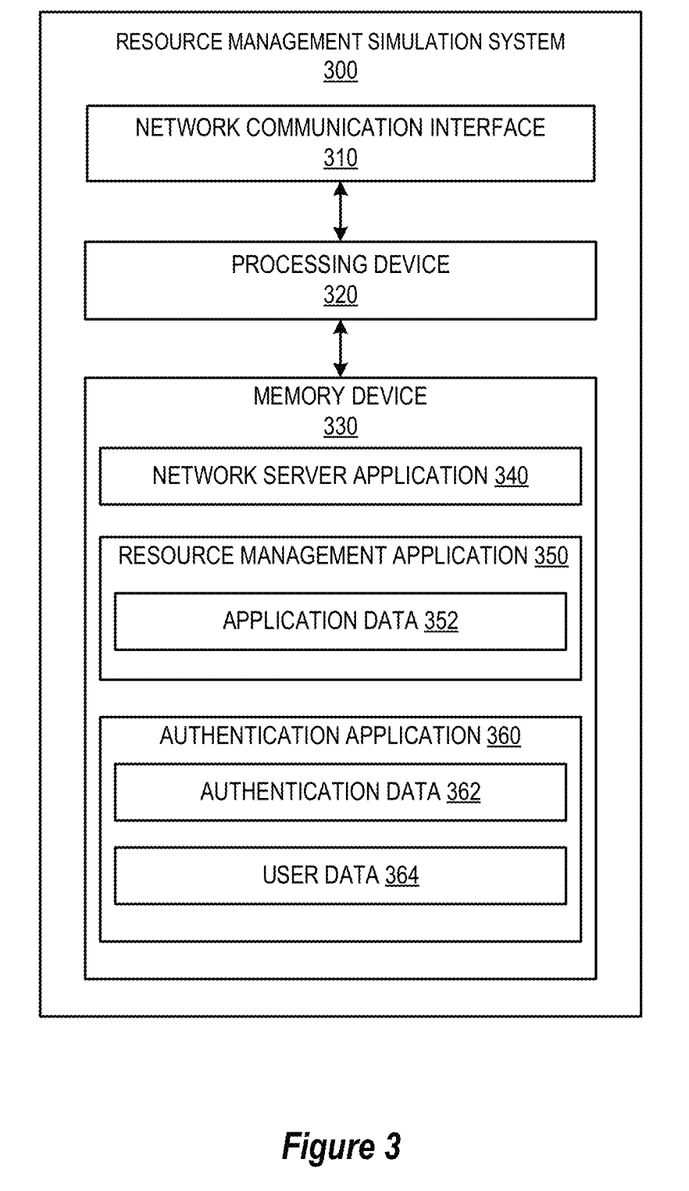
FIG. 3 provides a block diagram illustrating a resource management simulation system, in accordance with an embodiment of the invention.

FIG. 3 provides a block diagram illustrating the resource management simulation system 300, in greater detail, in accordance with embodiments of the invention. As illustrated in FIG. 3, in one embodiment of the invention, the resource management simulation system 300 includes one or more processing devices 320 operatively coupled to a network communication interface 310 and a memory device 330. In certain embodiments, the resource management simulation system 300 is operated by a first entity, such as a financial institution, while in other embodiments, the resource management simulation system 300 is operated by an entity other than a financial institution.

It should be understood that the memory device 330 may include one or more databases or other data structures/repositories. The memory device 330 also includes computer-executable program code that instructs the processing device 320 to operate the network communication interface 310 to perform certain communication functions of the resource management simulation system 300 described herein. For example, in one embodiment of the resource management simulation system 300, the memory device 330 includes, but is not limited to, a network server application 340, a resource management application 350 which includes application data 352, an authentication application 360 which includes a authentication data 362 and user data 364, and other computer-executable instructions or other data. The computer-executable program code of the network server application 340, the resource management application 350, and/or the authentication application 360 may instruct the processing device 320 to perform certain logic, data-processing, and data-storing functions of the resource management simulation system 300 described herein, as well as communication functions of the resource management simulation system 300.

In one embodiment, the resource management application 350 includes application data 352. The application data 352 may comprise information for storing data or information associated with one or more users. The application data 352 may additionally or alternatively include information for comparing data received from third party systems 140, such as resource exchange value information, to a stored database (e.g., a relational database) of associated information. In another embodiment, the application data 352 may include user preference information and associated information (e.g., transaction rules, images of users, documents associated with users, or the like) such that when the resource management simulation system 300 receives certain information, such as resource action information from the user 110, the resource management application 350 can perform the specified resource action by accessing resources in the user's resource accounts and transacting such resources to and from other systems based on the user's preferences or permissions.

In one embodiment, the authentication application 360 includes authentication data 362 and user data 364. The authentication data 362 may include passwords, personal identification numbers, security questions, biometric information, dynamic resource value information, expected dynamic resource value information, authentication images (e.g., images of a user's face), stepped-up authentication information, or other authentication credentials (including secondary or stepped-up authentication credentials) associated with one or more users. This authentication data 362 can be accessed by the authentication application 360 to compare received authentication credentials to the stored authentication credentials when determining whether a user is authorized for a transaction, for receiving access to an account, for receiving access to a digital wallet, for performing simulated or actual resource actions, or the like. The user data 364 may comprise any additional information that the authentication application 360 may store for use in authenticating a user, establishing a contactless NFC chip for a user (e.g., populating the NFC chip with information about the user, the user's authentication requirements or rules, the user's account information, or the like).

The network server application 340, the resource management application 350, and the authentication application 360 are configured to invoke or use the application data 352, the authentication data 362, the user data 364, and the like when communicating through the network communication interface 310 with the managing entity system 200, the one or more user device(s) 130, the VR system 120, and/or third party systems 140.

Figure 4:
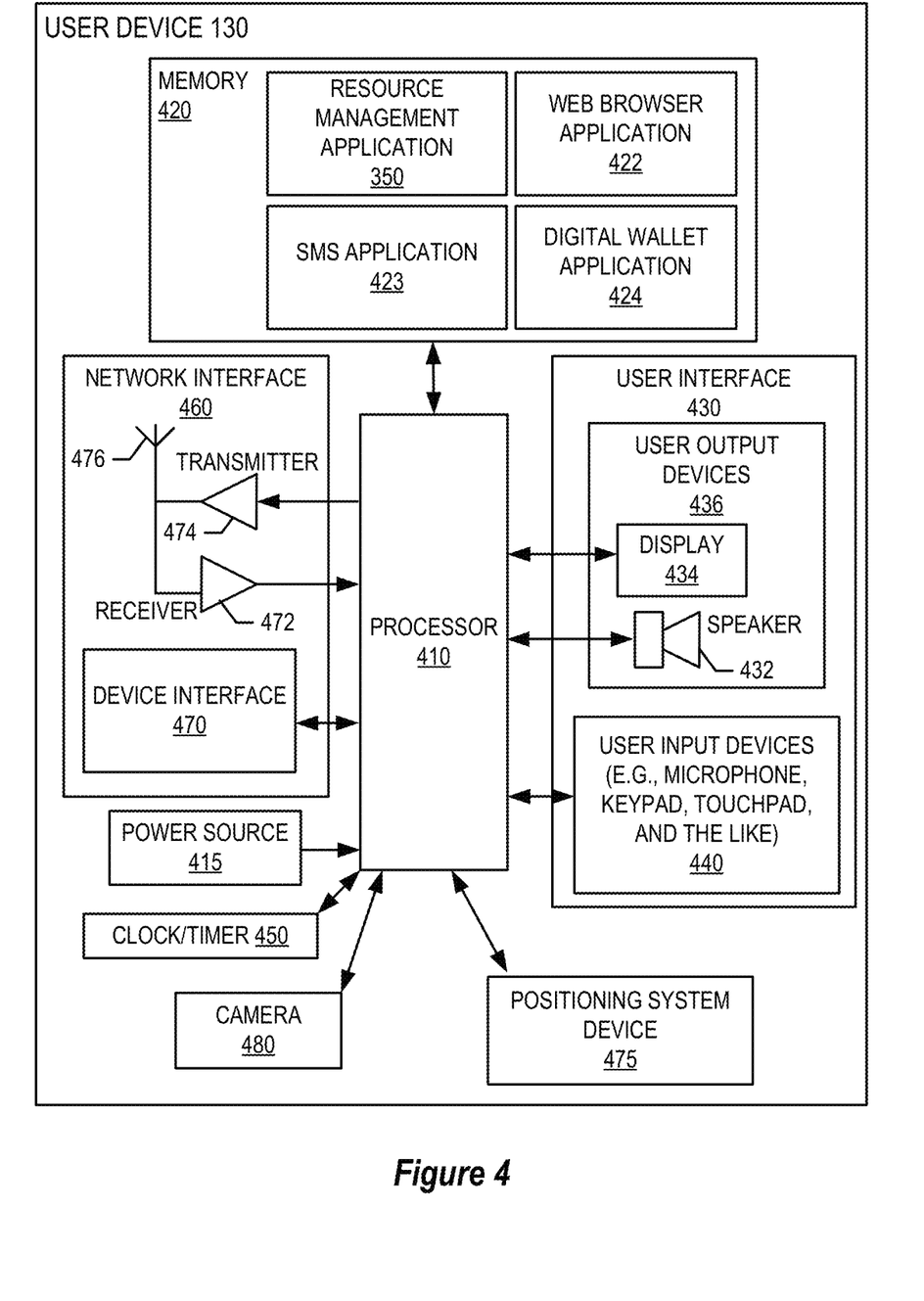
FIG. 4 provides a block diagram illustrating a user device in more detail, in accordance with embodiments of the invention.

FIG. 4 provides a block diagram illustrating a user device 130 of FIG. 1 in more detail, in accordance with embodiments of the invention. In one embodiment of the invention, the user device 130 is a mobile telephone or mobile computing device. However, it should be understood that a mobile telephone is merely illustrative of one type of user device 130 that may benefit from, employ, or otherwise be involved with embodiments of the present invention and, therefore, should not be taken to limit the scope of embodiments of the present invention. Other types of computing devices may include portable digital assistants (PDAs), virtual reality systems, pagers, mobile televisions, gaming devices, desktop computers, workstations, laptop computers, cameras, video recorders, audio/video player, radio, GPS devices, wearable devices, Internet-of-things devices, augmented reality devices, virtual reality devices, automated teller machine devices, electronic kiosk devices, or any combination of the aforementioned.

Furthermore, it should be known that multiple user device(s) 130 may be owned by or accessed by the user 110 within the system environment 100 of FIG. 1, and these separate user device(s) 130 may be in network communication with each other and the other systems and devices of the system environment 100. For example, a first user device 130 may comprise a mobile phone of the user 110 that includes an interface for working in concert with a second user device 130 that comprises a personal computer of the user 110 or a VR system 120 of the user 110.

Some embodiments of the user device 130 include a processor 410 communicably coupled to such devices as a memory 420, user output devices 436, user input devices 440, a network interface 460, a power source 415, a clock or other timer 450, a camera 480, and a positioning system device 475. The processor 410, and other processors described herein, generally include circuitry for implementing communication and/or logic functions of the user device 130. For example, the processor 410 may include a digital signal processor device, a microprocessor device, and various analog to digital converters, digital to analog converters, and/or other support circuits. Control and signal processing functions of the user device 130 are allocated between these devices according to their respective capabilities. The processor 410 thus may also include the functionality to encode and interleave messages and data prior to modulation and transmission. The processor 410 can additionally include an internal data modem. Further, the processor 410 may include functionality to operate one or more software programs, which may be stored in the memory 420. For example, the processor 410 may be capable of operating a connectivity program, such as a web browser application 422. The web browser application 422 may then allow the user device 130 to transmit and receive web content, such as, for example, location-based content and/or other web page content, according to a Wireless Application Protocol (WAP), Hypertext Transfer Protocol (HTTP), and/or the like.

The processor 410 is configured to use the network interface 460 to communicate with one or more other devices on the network 150. In this regard, the network interface 460 includes an antenna 476 operatively coupled to a transmitter 474 and a receiver 472 (together a "transceiver"). The processor 410 is configured to provide signals to and receive signals from the transmitter 474 and receiver 472, respectively. The signals may include signaling information in accordance with the air interface standard of the applicable cellular system of a wireless network. In this regard, the user device 130 may be configured to operate with one or more air interface standards, communication protocols, modulation types, and access types. By way of illustration, the user device 130 may be configured to operate in accordance with any of a number of first, second, third, and/or fourth-generation communication protocols and/or the like. For example, the user device 130 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, with LTE protocols, with 4GPP protocols, fifth-generation (5G) wireless communication protocols, millimeter wave technology, and/or the like. The user device 130 may also be configured to operate in accordance with non-cellular communication mechanisms, such as via a wireless local area network (WLAN) or other communication/data networks.

As described above, the user device 130 has a user interface that is, like other user interfaces described herein, made up of user output devices 436 and/or user input devices 440. The user output devices 436 include a display 430 (e.g., a liquid crystal display, organic light emitting diode display (OLED), or the like) and a speaker 432 or other audio device, which are operatively coupled to the processor 410.

The user input devices 440, which allow the user device 130 to receive data from a user such as the user 110, may include any of a number of devices allowing the user device 130 to receive data from the user 110, such as a keypad, keyboard, touch-screen, touchpad, microphone, mouse, joystick, other pointer device, button, soft key, and/or other input device(s). The user interface may also include a camera 480, such as a digital camera.

The user device 130 may also include a positioning system device 475 that is configured to be used by a positioning system to determine a location of the user device 130. For example, the positioning system device 475 may include a GPS transceiver. In some embodiments, the positioning system device 475 is at least partially made up of the antenna 476, transmitter 474, and receiver 472 described above. For example, in one embodiment, triangulation of cellular signals may be used to identify the approximate or exact geographical location of the user device 130. In other embodiments, the positioning system device 475 includes a proximity sensor or transmitter, such as an RFID tag, that can sense or be sensed by devices known to be located proximate a merchant or other location to determine that the user device 130 is located proximate these known devices.

The user device 130 further includes a power source 415, such as a battery, for powering various circuits and other devices that are used to operate the user device 130. Embodiments of the user device 130 may also include a clock or other timer 450 configured to determine and, in some cases, communicate actual or relative time to the processor 410 or one or more other devices.

The user device 130 also includes a memory 420 operatively coupled to the processor 410. As used herein, memory includes any computer readable medium (as defined herein below) configured to store data, code, or other information. The memory 420 may include volatile memory, such as volatile Random Access Memory (RAM) including a cache area for the temporary storage of data. The memory 420 may also include non-volatile memory, which can be embedded and/or may be removable. The non-volatile memory can additionally or alternatively include an electrically erasable programmable read-only memory (EEPROM), flash memory or the like.

The memory 420 can store any of a number of applications which comprise computer-executable instructions/code executed by the processor 410 to implement the functions of the user device 130 and/or one or more of the process/method steps described herein. For example, the memory 420 may include such applications as a conventional web browser application 422, or the resource management application 350, a digital wallet application 424, (or any other application provided by the managing entity system 200). These applications also typically instructions to a graphical user interface (GUI) on the display 430 that allows the user 110 to interact with the user device 130, the managing entity system 200, and/or other devices or systems. In one embodiment of the invention, when the user 110 decides to enroll in a resource management application 421 program, the user 110 downloads, is assigned, or otherwise obtains the resource management application 421 from the managing entity system 200, or from a distinct application server (e.g., from the resource management simulation system 300). In other embodiments of the invention, the user 110 interacts with the managing entity system 200 or the resource management simulation system 300 via the web browser application 422 in addition to, or instead of, the resource management application 421. The same mechanisms may be put in place to install, store, or otherwise access the digital wallet application 424.

The memory 420 of the user device 130 may comprise a Short Message Service (SMS) application 423 configured to send, receive, and store data, information, communications, alerts, and the like via a wireless telephone network.

The resource management application 421 may comprise an application stored in the memory 420 that is configured to control and/or communicate with the mobile device system 400 to receive data or information (e.g., codes, signals, or the like) from the user device 130. The resource management application 421 may also be configured to communicate information received from the web browser application 422, and/or the SMS application 423. In some embodiments, the resource management application 421 may be configured to receive instructions from a separate system (e.g., the managing entity system 200, the resource management simulation system 300, a separate user device 130, and/or a third party system 140 like a merchant system) and cause one or more components of the user device 130 to perform one or more actions. For example, the resource management application 421 may be configured to receive instructions for generating an alert on the user device 130 via audio or visual signals. The resource management application 421 may also cause the user device 130 to store or erase certain information located in the memory 420 or the digital wallet application 424 based on executed resource management actions.

The digital wallet application 424 of the user device 130 may comprise an application created by and/or managed by a financial institution that is configured to securely store financial information, account information, user information, billing information, shipping information, authentication information, dynamic resource value information (e.g., dynamic card verification code information), or the like. The digital wallet application 424 may be configured to receive account or card information (e.g., credit card information) and automatically populate fields within the digital wallet application 424 with the information. For example, the received information may be formatted such that the information type and the information field is known and by the digital wallet application 424 (e.g., based on position or coding) and can therefore be matched to an applicable field of the digital wallet application 424.

The memory 420 can also store any of a number of pieces of information, and data, used by the user device 130 and the applications and devices that make up the user device 130 or are in communication with the user device 130 to implement the functions of the user device 130 and/or the other systems described herein. For example, the memory 420 may include such data as transaction history data, positional data of the user device 130, biometric authentication information for the user 110, device identifiers for one or more other user devices 130, wireless network authentication information, and the like.

Figure 5:
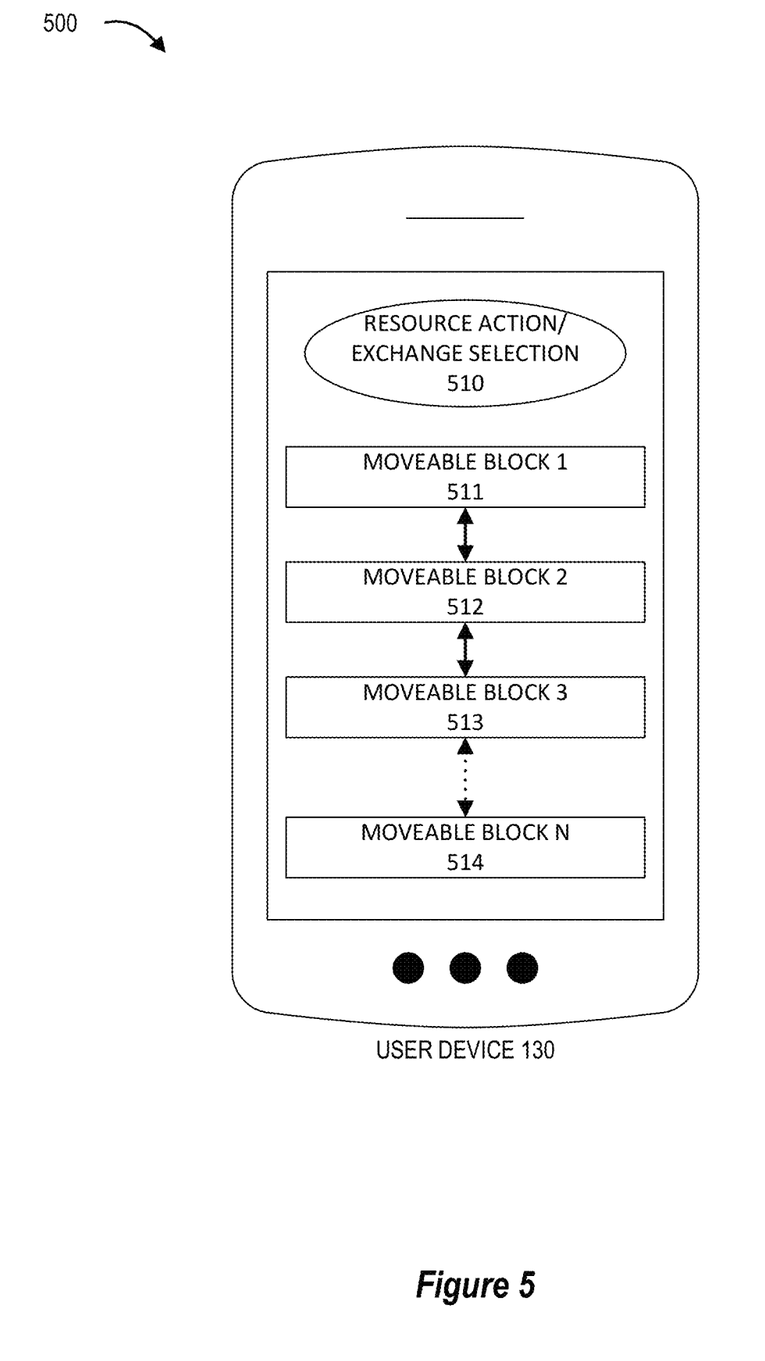
FIG. 5 provides a representative depiction to illustrate a graphical user interface for resource management simulation, in accordance with embodiments of the invention.

Referring now to FIG. 5, a representative depiction is provided to illustrate one embodiment of a graphical user interface 500 for resource management simulation, in accordance with embodiments of the invention. In some embodiments, the graphical user interface 500 may be displayed on any number of different forms of user device 130 or via VR system 120.

As shown, the graphical user interface 500 includes a resource action/exchange selection 510, wherein the user 110 can select from various customizable templates for resource actions to be performed or simulated with any number of supported resources and exchanges. The invention comprises a user friendly resource investment strategy platform. The graphical user interface allows for a drag-and-drop platform for various sectors, timing, and the like. in the form of moveable blocks. This allows a user to generate any desired resource management strategy and the system may deploy the strategy as a simulated resource management action. Furthermore, the system allows for deployment of the resource action live on a resource exchange upon user authorization. The blocks include object codes that are programmed to build out any possible resource management strategy. There may also be thresholds, templates, and the like that allow for customization via a number of user settings, or within the moveable blocks themselves.

Further illustrated are movable block 1 511, moveable block 2 512, moveable block 3 513, and moveable block N 514. These moveable blocks are shown to indicate that any number "N" moveable blocks may be selected from the resource action/exchange selection 510 in order to be executed by the resource management simulation system 300. As stated, the moveable blocks allow the user 110 to select various blocks and drag and drop them via the graphical user interface and execute back end object codes that are programmed to build out any possible resource management strategy. For instance, the user may select a moveable block 1 511 that, in one embodiment, represents the investment of resources in a particular investment vehicle, stock, currency, or on a particular resource exchange, such as the NYSE, NASDAQ, cryptocurrency exchange, and the like.

Furthermore, the user 110 may choose to customize the timing of the investment based on resource exchange patterns or templates provided by the resource management simulation system 300. For instance, the resource management simulation system 300 may have received historical resource exchange values for a certain investment vehicle, sentiment analysis data from a third party, calculated investment predictions based on current resource exchange values as compared to historical resource exchange values, or extrapolated resource exchange value patterns over time according to resource volume, frequency, price, relative strength index, or other exchange metrics that the resource management simulation system 300 may access from the managing entity system 200 or third party system 140. In some embodiments, the graphical user interface includes a resource action/exchange selection 510 wherein moveable blocks displayed for selection by the user 110 are sorted by thresholds, template resource actions, and customizable resource management strategies.

The user 110 may choose to further customize the moveable blocks according to any or all of the previously described metrics by setting threshold stop values or triggers based on any given threshold that the user may desire, such as resource amount, current or historical resource exchange value, or other metric such as resource volume, frequency, price, relative strength index, other exchange metrics, and the like. By customizing and placing the moveable blocks, the resource may create a resource action which can then be received, stored, and executed by the resource management simulation system 300 in the form of a "dark" simulated resource action, wherein the resources are not actually transferred or moved, or in other embodiments may execute in the form of a live resource action on a resource exchange with the authorization of the user 110.

Figure 6:
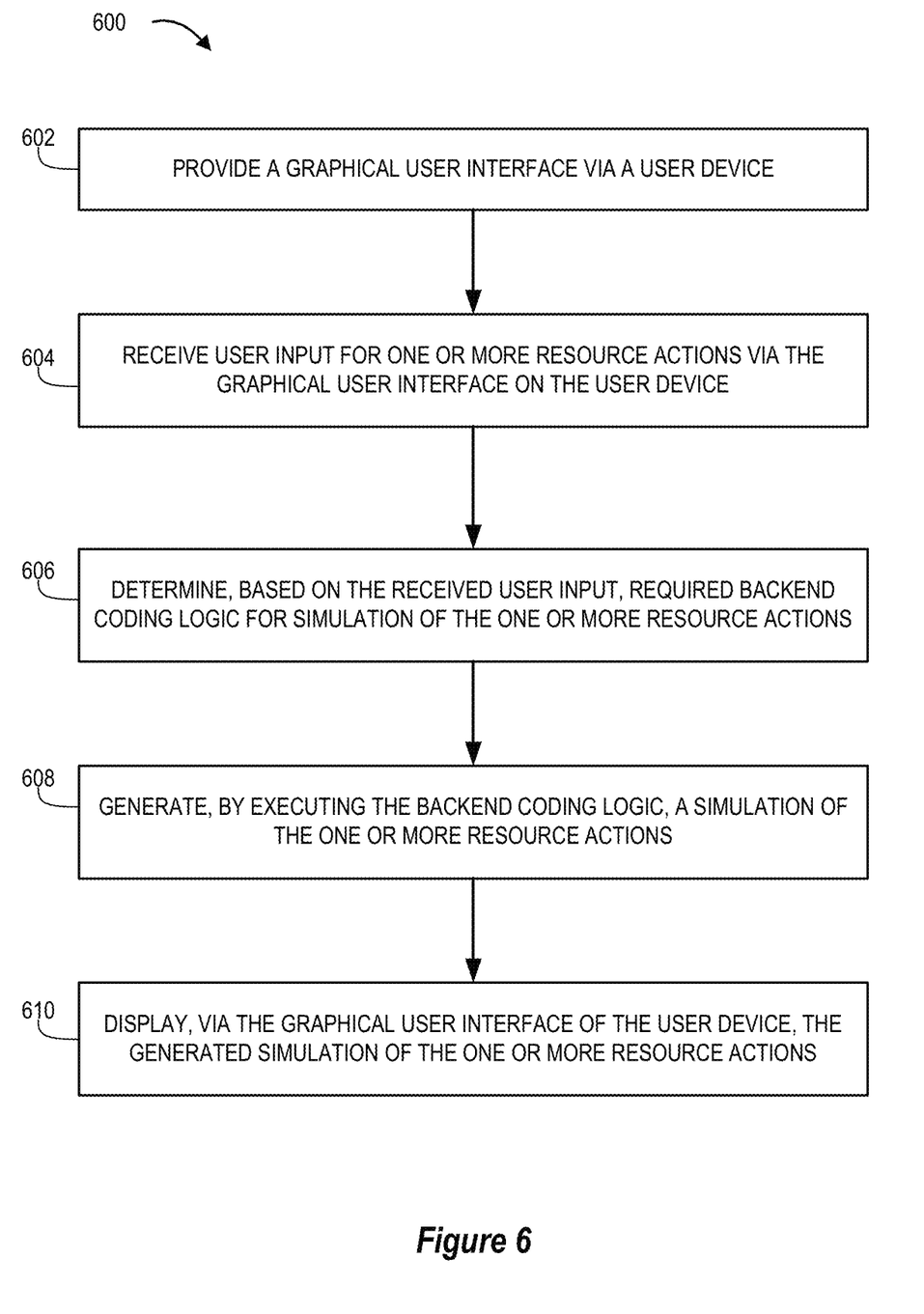
FIG. 6 provides a flowchart to illustrate a process for resource management simulation, in accordance with embodiments of the invention.

Referring now to FIG. 6, a flowchart is provided to illustrate one embodiment of a process 600 for resource management simulation, in accordance with embodiments of the invention. In some embodiments, the process 600 may include block 602, wherein the resource simulation management system 300 provides a graphical user interface via a user device, such as user device 130. Next, the process proceeds to block 604, wherein the system receives user input for one or more resource actions via the graphical user interface on the user device 130, or in some cases via some other device such as the VR system 120. The system then determines, based on the received user input, required backend coding logic and object code for simulation or execution of the one or more resource actions, as shown in block 606.

As discussed previously, the resource actions comprise one or more actions that the user 110 has customized based on the moveable blocks, as depicted in the representative embodiment of FIG. 5. The moveable blocks are supported by backend coding logic such as object code in any number of different coding languages, which may be complex and require advanced coding proficiency in order to build and perform effectively in response to incredibly fast paced resource exchanges. For instance, in some embodiments, the code may be programmed in an object oriented programming language such as Python, wherein other embodiments may use a different coding language such as Java, C/C++, K, R, and the like in order to build out an algorithmic resource trading or resource management apparatus. All of the backend coding logic is programmed by administrators and engineers of the managing entity system 200 or resource management simulation system 300 such that the user 110 does not have to be proficient in any coding language in order to build out a complex resource management algorithm for executing the desired resource action(s).

Next, as shown in block 608, the system may generate, by executing the backend coding logic, a simulation of the one or more resource actions that the user has chosen or customized. In this way, the system may use historical resource exchange information, current real time resource exchange values, or other dynamic metric data received or stored by the resource simulation management system 300 in order to build out the necessary back end coding logic to perform the resource action. The system may then use the received data to execute the resource action and generate a simulation of how the resource action would perform given the resource exchange data available. Finally, the system may display, via the graphical user interface 500 of the user device 130, the generated simulation of the one or more resource actions that the user 110 has chosen to execute. It is understood that in some embodiments, the system may actually execute the resource action by initiating the transfer of resources and executing the corresponding backend coding logic in order to create real time resource fluctuations which the user can monitor via the user device 130.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, and the like), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A system for backend resource management simulation, the system comprising:
a memory device; and
a processing device operatively coupled to the memory device, wherein the processing device is configured to execute computer-readable program code to:
provide a graphical user interface via a user device;
receive user input for one or more resource actions via the graphical user interface on the user device;
determine, based on the received user input, required backend coding logic for simulation of the one or more resource actions;
generate, by executing the backend coding logic, a simulation of the one or more resource actions; and
display, via the graphical user interface of the user device, wherein the graphical user interface is provided via a virtual reality system, and the system is further configured to receive user input for the one or more resource actions by processing transmitted motion, audio, or biometric information from the virtual reality system, the generated simulation of the one or more resource actions, wherein the one or more resource actions on the graphical user interface are represented by one or more moveable blocks, wherein the moveable blocks may be rearranged by the user and contain fields for additional user input comprising resource amounts, resource types, or resource exchanges.

2. The system of claim 1, further configured to display, via the graphical user interface of the user device, a selectable option to implement the one or more resource actions based on results of the generated simulation.

3. The system of claim 1, wherein generating the simulation of the one or more resource actions further comprises:
retrieving current and historical resource value information from one or more entity systems;
continuously calculating the result of the one or more resource actions based on the current and historical resource value information; and
providing periodic updated simulation results to the user via the graphical user interface.

4. The system of claim 1, further configured to:
receive, via the user device, user authentication credentials;
authenticate the user to enable access to one or more user resource accounts; and
initiate the transfer of resources to or from the one or more user resource accounts.

5. The system of claim 1, wherein the resource actions on the graphical user interface are represented by one or more moveable blocks, wherein the moveable blocks are sorted by thresholds, template resource actions, and customizable resource management strategies.

6. A computer program product for backend resource management simulation, the computer program product comprising at least one non-transitory computer readable medium comprising computer readable instructions, the instructions comprising instructions for:
providing a graphical user interface via a user device;
receiving user input for one or more resource actions via the graphical user interface on the user device;
determining, based on the received user input, required backend coding logic for simulation of the one or more resource actions;
generating, by executing the backend coding logic, a simulation of the one or more resource actions; and
displaying, via the graphical user interface of the user device, wherein the graphical user interface is provided via a virtual reality system, and the system is further configured to receive user input for the one or more resource actions by processing transmitted motion, audio, or biometric information from the virtual reality system, the generated simulation of the one or more resource actions, wherein the one or more resource actions on the graphical user interface are represented by one or more moveable blocks, wherein the moveable blocks may be rearranged by the user and contain fields for additional user input comprising resource amounts, resource types, or resource exchanges.

7. The computer program product of claim 6, further configured to display, via the graphical user interface of the user device, a selectable option to implement the one or more resource actions based on results of the generated simulation.

8. The computer program product of claim 6, wherein generating the simulation of the one or more resource actions further comprises:
retrieving current and historical resource value information from one or more entity systems;
continuously calculating the result of the one or more resource actions based on the current and historical resource value information; and
providing periodic updated simulation results to the user via the graphical user interface.

9. The computer program product of claim 6, further configured to:
receive, via the user device, user authentication credentials;
authenticate the user to enable access to one or more user resource accounts; and
initiate the transfer of resources to or from the one or more user resource accounts.

10. The computer program product of claim 6, wherein the resource actions on the graphical user interface are represented by one or more moveable blocks, wherein the moveable blocks are sorted by thresholds, template resource actions, and customizable resource management strategies.

11. A computer implemented method for backend resource management simulation, said computer implemented method comprising:
providing a computing system comprising a computer processing device and a non-transitory computer readable medium, where the computer readable medium comprises configured computer program instruction code, such that when said instruction code is operated by said computer processing device, said computer processing device performs the following operations: readable instructions, the instructions comprising instructions for:
providing a graphical user interface via a user device;
receiving user input for one or more resource actions via the graphical user interface on the user device;
determining, based on the received user input, required backend coding logic for simulation of the one or more resource actions;
generating, by executing the backend coding logic, a simulation of the one or more resource actions; and
displaying, via the graphical user interface of the user device, wherein the graphical user interface is provided via a virtual reality system, and the system is further configured to receive user input for the one or more resource actions by processing transmitted motion, audio, or biometric information from the virtual reality system, the generated simulation of the one or more resource actions, wherein the one or more resource actions on the graphical user interface are represented by one or more moveable blocks, wherein the moveable blocks may be rearranged by the user and contain fields for additional user input comprising resource amounts, resource types, or resource exchanges.

12. The computer implemented method of claim 11, further configured to display, via the graphical user interface of the user device, a selectable option to implement the one or more resource actions based on results of the generated simulation.

13. The computer implemented method of claim 11, wherein the resource actions on the graphical user interface are represented by one or more moveable blocks, wherein the moveable blocks are sorted by thresholds, template resource actions, and customizable resource management strategies.

14. The computer implemented method of claim 11, wherein generating the simulation of the one or more resource actions further comprises:
retrieving current and historical resource value information from one or more entity systems;
continuously calculating the result of the one or more resource actions based on the current and historical resource value information; and providing periodic updated simulation results to the user via the graphical user interface.

15. The computer implemented method of claim 11, further configured to:
- receive, via the user device, user authentication credentials;
- authenticate the user to enable access to one or more user resource accounts; and
- initiate the transfer of resources to or from the one or more user resource accounts, wherein the one or more user resource accounts are located at or managed by third party entities.

\* \* \* \* \*